Dec. 30, 1952     J. E. BILLINGSLEY, JR     2,623,422

REAMING TOOL WITH REMOVABLE BLADES

Filed June 2, 1950

INVENTOR,
JAMES E. BILLINGSLEY JR.
BY *A. M. Fisher*
ATTORNEY.

Patented Dec. 30, 1952

2,623,422

UNITED STATES PATENT OFFICE 2,623,422

REAMING TOOL WITH REMOVABLE BLADES

James E. Billingsley, Jr., Hannibal, Mo.

Application June 2, 1950, Serial No. 165,845

2 Claims. (Cl. 77—72)

This invention relates to reaming tools as used by mechanics for reaming out holes or bores in metal structures of any kind, and the invention has particular reference to pilot reamers, step reamers, core drills, end mills and like tools.

The primary purpose and object of the invention is to provide tools of this kind having removable blades that may be inserted in the blade holder or head of the tool, and there locked in position for use in reaming or cutting or the like sort of work, the blades being adapted when so locked in working position, to stand practically as solid and as fixed as the blades of any solid or integrally formed unit would be, and so that such blades may be removed and replaced and readjusted as may be desired, as the blades become worn in use.

It is a further object of the invention to provide a tool of the kind referred to having a blade holding head of hollow and cylindrical or tubular formation, the walls thereof being longitudinally slotted in equi-spaced relation for removably receiving a plurality of reaming or cutting blades, and means for releasably locking the blades in working position in the head, whereby as the blades become worn in use, they may be removed and reground and then reinserted in the head and adjusted and locked therein for use again, and may be thus repeatedly removed and reinserted and readjusted and locked as the work may require.

Another object of the invention is to construct a tool of this kind with a minimum number of parts, said parts being made of such materials as are best suited for their respective purposes, and the inherent physical properties of the several parts being utilized for carrying out and effectuating the purposes of the invention, and whereby the novelty and utilitarian features of the tool are partly accomplished.

Another object of the invention is to provide a tool of the kind referred to, and wherein may be employed several working blades, the number and arrangement of the blades being dependent only upon the character of the work for which the tool is to be used, and the longitudinal slots of the tubular working head of the tool being tapered radially from their inner basal openings to their outwardly narrowed openings, and the said blades being similarly and complementally tapered from their inner basal edges to their outwardly projected cutting edges, whereby they may be removably inserted into the slots with their basal edges projected somewhat into the hollow center of the tubular head, and means for releasably locking the blades in fixed position in the head, ready for work.

With the above stated objects in view, together with such other and additional objects and advantages as may appear from the specification, attention is now directed to the accompanying drawings, wherein Figure 1 is a longitudinal side elevation of the working end of a reaming tool as constructed in accordance with this invention, the outer end of the supporting rod, shaft or mandrel of the tool being broken off.

Figure 1:
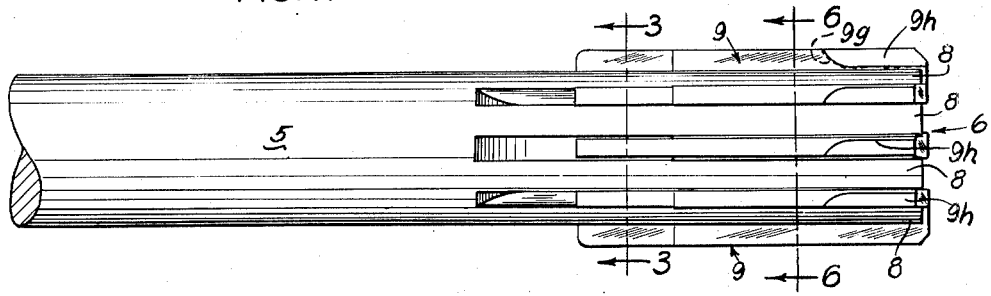
Figure 2:
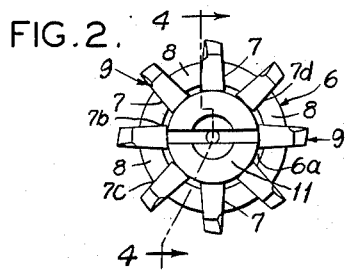
Figure 2 is an end view, looking towards the right hand end of Figure 1.
Figure 3:
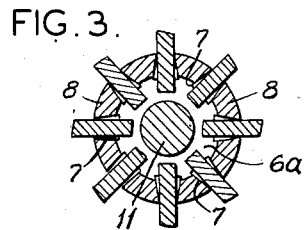
Figure 3 is a transverse section on the line 3—3 of Figure 1.
Figure 6:
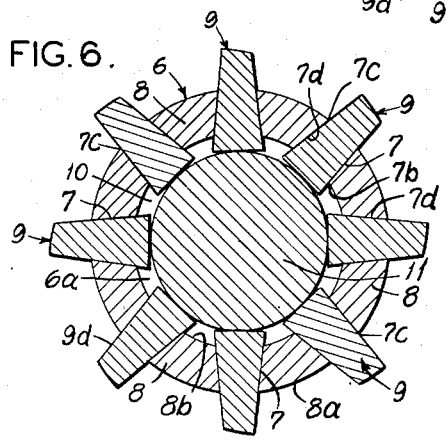

Figure 6 is a transverse section on an enlarged scale, taken on the line 6—6 of Figure 1, showing a group of blades as assembled within the slots of the head of the tool, the inwardly projected bases of the blades bearing upon the cylindrically tapered outer end or plug of the locking element as drawn outwardly into a relatively retracted position within the conical socket of the head of the tool, as formed by the bases of the inserted blades, and the said blades being correspondingly retracted radially inward for bearing upon the said plug.

Figure 7:
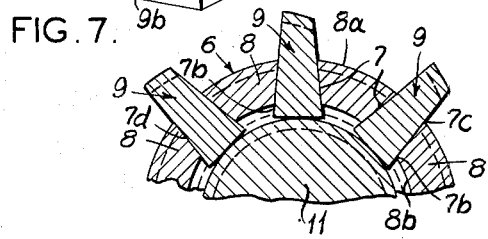

Figure 7 is a fragmentary sectional view similar to that of Figure 6, showing however the conical end of the locking element or plug threadedly turned further into the complemental conical socket of the head of the tool, as formed by the bases of the assembled blades, and whereby the said blades are thereby pushed radially outward through the slots of the head of the tool.

In practising this invention, I provide an evenly rounded metallic supporting rod, shaft or mandrel 5, at the outer working end of which is rigidly and longitudinally extended a cylindrically hollowed or tubular head 6, the inner bore 6a of which is further extended axially inward, but in a reduced diameter, as shown at 6b, and the walls of this bore are tapped as indicated at 6c; this construction thus providing the raised annular shoulder 6d at the juncture of the two bores 6a and 6b.

The cylindrical walls of the hollow tubular head 6 are slotted through longitudinally and radially inward, in circumferential equi-spaced relation, through the outer open end of the hollow head, for forming the blade receiving slots 7 and the blade supporting and locking prongs 8. As will be seen in Figure 6, the blade receiving slots 7 are extended radially and taperingly outward from their inner and wider openings 7b which open downward into the bore 6a of the head, to their outer and narrower openings 7c, the tapering sides 7d of these slots being uniform throughout. Thus these slots so formed provide the said intervening and complementally shaped blade supporting and locking prongs 8, with their outer and wider edges 8a and their inwardly tapered inner edges 8b, with their tapering sides 7d. Thus these slots 7 and prongs 8 are adapted for removably receiving and lockingly engaging the metallic reaming and cutting blades 9 of the tool, and which blades will now be described.

Figure 5:
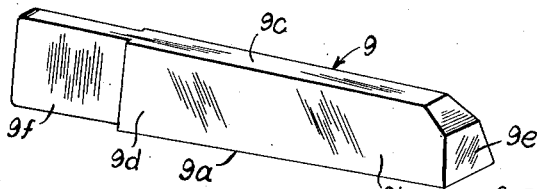
Figure 5 is a perspective view on an enlarged scale, of one of the blades of the tool.

One of these blades is shown in enlarged perspective in Figure 5, and it will be noted that they are formed and shaped and dimensioned so as to nicely fit into any one of the slots 7, their inner basal edges 9a being broader or wider and their sides 9b tapering inward to their outer working edges 9c. It is to be noted, however, that the inner, wider and basal edges 9a of the blades do not extend in parallelism, with their outer working edges 9c, but that they taper somewhat from the inner or butt ends 9d to the outer ends 9e thereof, and it is further to be noted that the sides 9b are wider from their outer to their inner edges than are the sides 7d of the locking prongs 8 defining the slots 7, whereby when all of the blades 9 are fitted into their respective slots, the basal edges 9a project substantially down into the central bore 6a of the head 6, while their outer or working edges 9c project substantially outward of the slots 7 and outward of the intervening blade supporting and locking prongs 8 of the head, in proper position and alignment to engage the work. The inner butt ends 9d of the blades are formed with their squared ends flatly reduced to parallel relation, as shown at 9f in Figure 5, thus adapting these squared butt ends to effectually and firmly abut and lodge against the shoulder 6d at the juncture of the bores 6a and 6b, as the blades are inserted into the slots 7 of the head 6. Thus a perfect working alignment of the assembled blades is effected.

Figure 4:
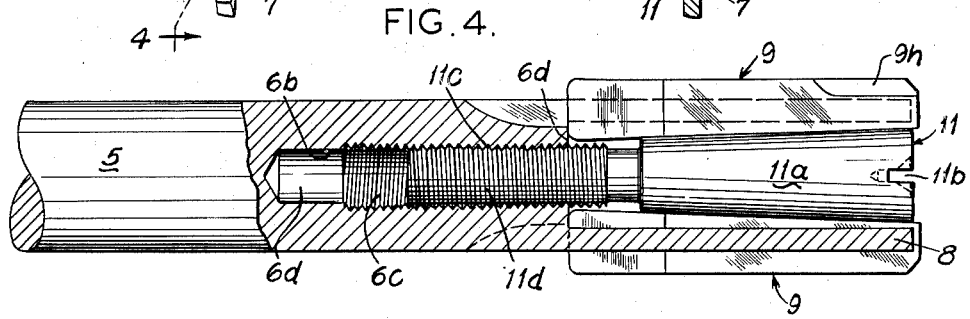
Figure 4 is a longitudinal section on a plane extended axially through the working end of the tool, the axially positioned and threaded locking element and one of the inserted blades and the broken off end of the supporting rod of the tool being shown in full lines.

Due to the described endwise tapering of the inner basal edges 9a of the blades 9 from the inner to the outer ends thereof, it results that when all of the blades are fitted into their respective slots, in manner shown in Figure 6, the inwardly projected basal edges 9a of the assembled blades co-operate in forming a sort of conical socket 10 for receiving a complementally tapered locking element 11, and which will now be described. Said locking element 11 is formed with an elongated outer and conical head portion 11a, complemental to and adapted to fit freely and nicely into the conical socket 10 as formed and provided by the blades 9 as same are assembled within their slots 7 as aforesaid, there being a kerf 11b formed in the outer end of this head portion for engaging the bit of a screw-driver (not shown), for operating the locking element 10. A threaded bolt 11c is rigidly and axially extended from the inner tapered end of the locking element 11, and is properly dimensioned and screw-threaded, as at 11d, to threadedly turn into the reduced bore 6b of the head 6, said bolt, however, being of shorter length than the bore so as to provide a vacant space in the inner end of the bore as shown at 6d in Figure 4. With the elements of the tool constructed and assembled as described, it is obvious that with the tapered locking element somewhat retracted from its socket 10, the blades 9 which bear inwardly upon the conical locking head or plug 11a, will also be slightly retracted radially, and that on the other hand when the locking element 11 is screwed inwardly by screwing the bolt 11c into the threaded bore 6b of the head, these blades will be pushed radially slightly outward. In such operation it is to be noted that the entire body of the head 6, including the locking prongs 8 and the interlocked blades 9, will be expanded or pushed slightly and radially outward, against the tapering or converging sides 7d of the prongs 8, thus causing the radial expansion of the prongs 8. However, a simultaneous transverse pinching force is exerted and imposed, by this same action and inward movement of the locking element 11, upon the sides 9b of the blades 9, thus locking these blades firmly into operative position at their points of radial adjustment.

In use and operation, the tool is mounted in any conventional machine provided for use with such reamers and wherein means are provided for gripping and rotating the shaft or mandrel 5 of the tool. The blades are, of course, adjusted radially outward in manner described, to serve the purpose at hand. And when the blades are worn off in use at their working edges, they are then expanded slightly, as may be required, to offset this wear, in the manner above set out. Or, the blades may be removed and reground and then reinserted and adjusted for further work.

As indicated above, the tool and blades are to be constructed of the specific kinds of material best suited and adapted for their respective purposes. Reaming tools generally are used for several purposes, one of which for example, as in core drills, requires relatively heavy and rigid working heads, and in such case the tubular working head of the tool should be formed with thicker and heavier and well tempered walls for rigidly and fixedly supporting the blades. In other situations, as where more elasticity is required in the working head of the tool, these walls may be thinner and more elastic. These matters are, of course, determined by the kinds of metals employed and the tempering imparted thereto. The same remarks apply to the making of the reaming and cutting blades. Some blades should be tempered highly and the entire lengths of the blade edges employed in specific kinds of work. In other cases, the blades may be tempered to a lesser degree and hardened cutting tips employed of tungsten carbide or the like, such tips being installed by recessing out a seat therefor at the outer end of the blade, as indicated in dotted lines at 9g in Figure 1, and then welding the tips 9h into such seats. These blades may be sharpened as required for various kinds of work. These reamers are, of course, made in varying sizes and diameters to meet the requirements of the work involved. And while the blade receiving slots are here shown and described as longitudinally and straightly extended into the working head of the tool, in lieu of this arrangement the slots could be formed spirally inward from the outer to the inner end of the working head, to meet the requirements of any particular class or kind of work, and as will be fully shown and described in a subsequent application. Bores 12 may be formed axially in the outer end of the rod or mandrel 5 and in the outer end of the conical plug 11a of the locking element 11, for adapting the tool to be mounted in a lathe or the like for truing up or blade sharpening.

The tool as above described may be used in other kinds of work than ordinary reaming, as the working head is adapted for holding several other forms of working elements as used in and about various kinds of machine operations.

It is thought that from the foregoing description, the construction and use of the tool will be fully understood, and while I have herein shown and described a specific form of the tool, it is understood that the structural details shown may be changed or modified as desired, within the scope of the appended claims.

I claim:

1. In a reamer, a cylindrical shaft of uniform diameter throughout, the front end of said shaft having a bore extending axially of the shaft and terminating at its inner end in a plane surface, the wall around said bore having a series of slots spaced evenly around its circumference, said slots having outwardly converging sides and extending inwardly beyond said plane surface, blades held in said slots and having each a forward body portion provided with converging sides corresponding to the sides of the slots, each of said blades having a relatively thin rear end fitting freely in the respective slot and abutting on said plane surface.

2. In a reamer, a cylindrical shaft of uniform diameter throughout, the front end of said shaft having a bore extending axially of the shaft and terminating at its inner end in a plane surface, the wall around said bore having a series of slots spaced evenly around its circumference, said slots having outwardly converging sides and extending inwardly beyond said plane surface, blades held in said slots and having each a forward body portion provided with converging sides corresponding to the sides of the slots, each of said blades having a relatively thin rear end fitting freely in the respective slot and abutting on said plane surface, said blades having inner and outer edges diverging from front to rear, said shaft having a threaded bore extending from said plane surface, and a blade securing screw in said threaded bore and having a frusto-conical fitting between said blades and engaging the inner edges thereof.

JAMES E. BILLINGSLEY, Jr.

REFERENCES CITED

The following references are of record in the file of this patent:

UNITED STATES PATENTS

| Number | Name | Date |
|---|---|---|
| 317,715 | Brown | May 12, 1885 |
| 959,104 | Barker | May 24, 1910 |
| 1,350,394 | Van Der Vorn | Aug. 24, 1920 |

FOREIGN PATENTS

| Number | Country | Date |
|---|---|---|
| 132,984 | Germany | Aug. 2, 1902 |